Feb. 23, 1965
H. RIDGWAY
3,170,357
SHEARING MACHINE WITH A PIVOTAL BLADE HAVING
ECCENTRIC MEANS TO ADJUST BLADE ALONG
AXIS OF THE PIVOT
Filed Dec. 13, 1960
2 Sheets-Sheet 1
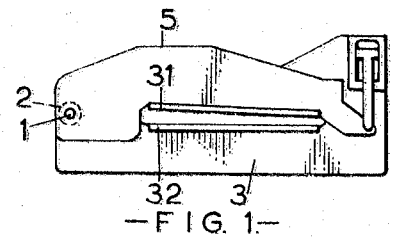
—FIG. 1.—
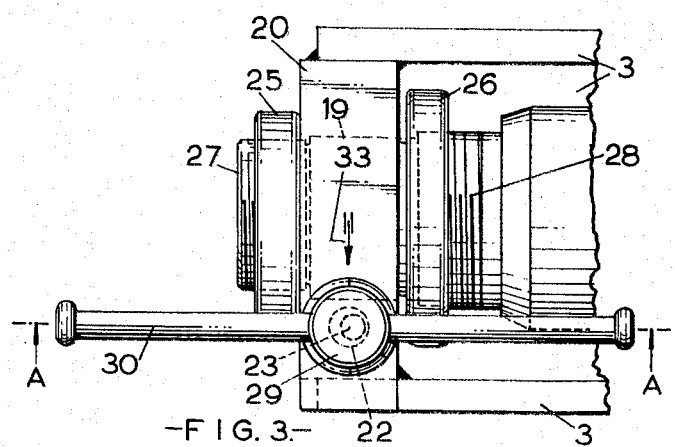
—FIG. 3.—
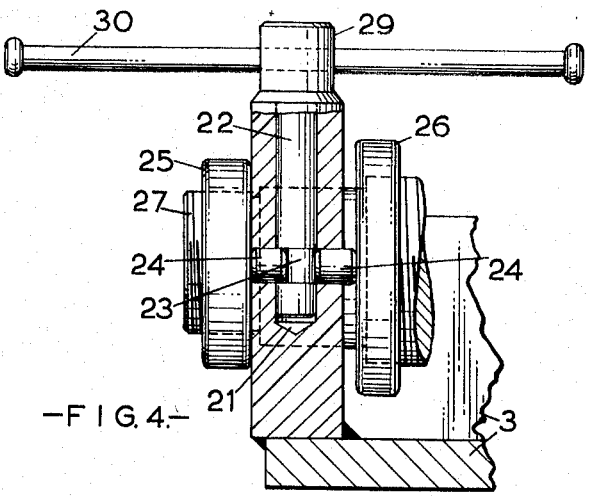
—FIG. 4.—

United States Patent Office 3,170,357
Patented Feb. 23, 1965

3,170,357
SHEARING MACHINE WITH A PIVOTAL BLADE HAVING ECCENTRIC MEANS TO ADJUST BLADE ALONG AXIS OF THE PIVOT
Harry Ridgway, Sandal, Wakefield, England, assignor to Joseph Rhodes & Sons Limited, Wakefield, England, a British company
Filed Dec. 13, 1960, Ser. No. 75,494
Claims priority, application Great Britain, Dec. 18, 1959, 43,044/59
3 Claims. (Cl. 83—608)

This invention relates to machines for cutting or shearing sheets or plates (hereinafter termed "plates") of the type embodying a fixed blade and a movable blade capable of a pivotal motion.

Shearing machines of the type with which this invention is concerned include a blade carrying beam pivoted to a frame structure with the beam lying longitudinally at a right angle to the beam axis. The blade may have a downward rake away from the beam pivot in relation to a fixed blade, and means for operating the beam at a point remote from the pivot. Such a machine is designed to be capable of cutting varying thicknesses of plate and with thicker plates, say in the order of three-quarters of an inch, it is advantageous to provide cutting clearance for the beam blade towards the end of its stroke.

According to the present invention there is provided a shearing machine, comprising a blade carrying beam pivoted to a frame structure in relation to a fixed blade, said beam being carried by a pivot element mounted to be capable of axial movement and transmitting lateral movement to the beam, and means for adjusting said element axially within given limits to provide a required predetermined cutting clearance for the blade of the beam in relation to the fixed blade.

The invention includes adjusting means having an eccentric located between spaced stop members. At least one of the stop members may be adjustable, say screw-thread adjustment.

The invention will now be more particularly described with reference to the accompanying drawings, in which:

FIG. 1 is a diagrammatic drawing of a shearing machine;

FIG. 3 is a plan view from above of the shaft adjusting means; and

FIG. 4 is a sectional elevation on the line A—A of FIG. 3.

Figure 2:
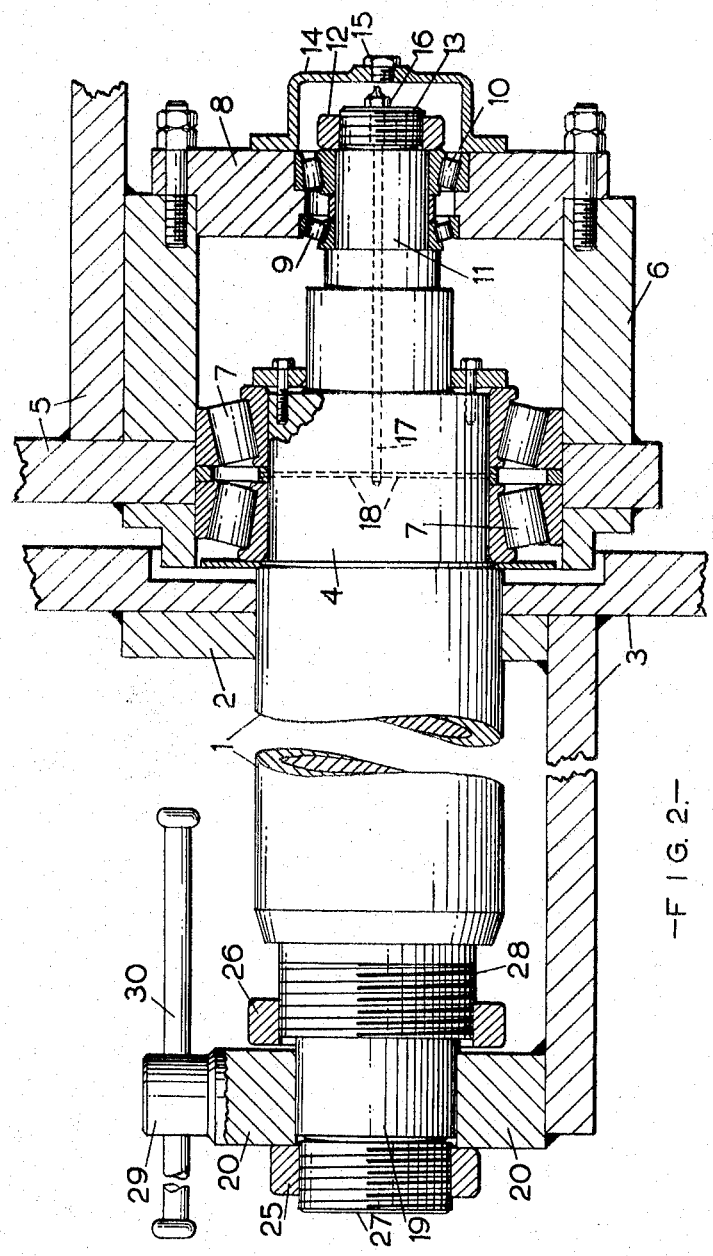
FIG. 2 is a sectional elevation of the pivot shaft and adjusting means of the machine beam carrying the movable blade.

In the illustrated embodiment of this invention a pivot shaft 1 is mounted horizontally in a bearing 2 of the machine frame structure 3 and on one stepped projecting end 4 is pivoted the blade carrying beam 5. The blade beam is furnished with a housing 6 enclosing main thrust roller bearings 7 mounted between stop means on the part 4 of the pivot shaft and such housing has a removable end plate 8 containing smaller thrust roller bearings 9, 10 retained on the outer reduced end 11 of the pivot shaft by a nut 12 on the further reduced end 13. This end 13 of the shaft projects into a removable cover cap 14 which has a removable plug 15 for the introduction of a lubricant through a grease nipple 16 in the end of the shaft to force it through ducts 17, 18 (or channels) to the main roller bearings 7.

The other end 19 of the pivot shaft 1 is also reduced, this end is of stepped formation, and this shaft end passes through an upstanding bearing 20 through which is formed a vertical hole 21 off-set to one side of the shaft end and in this hole is located a spindle 22 having one part 23, intermediate its ends, forming an eccentric. Opposite this eccentric, in the same plane as and parallel with the shaft axis, are formed a pair of holes in alignment and in these are arranged a pair of small plungers 24 operable by the eccentric. Said eccentric is smaller in diameter than the spindle and thus at least one plunger has its inner end between shoulders and so positioned retains the spindle against withdrawal. On each side of this bearing is arranged a stop collar 25 or 26 each screw-threaded on to part 27 or 28 of the pivot shaft for adjustment purposes. These two collars are spaced to furnish adjustable working clearance for the shaft 1 to be given required axial adjustment. The eccentric carrying spindle 22 is furnished with operating means, such as a head member 29 with a through handle 30 like a double tommy-bar.

With the above arrangement, by rotating the spindle 22 and thus the eccentric 23 the latter will apply thrust to one of the stop collars 25 or 26 to move the shaft 1 axially and thus the pivot end of the beam 5 so that the blade 31 carried by the beam 5 will be adjusted towards or away from the usual fixed cutting blade 32. It will readily be understood that the stop collars 25, 26 can be readily adjusted for the initial setting of the movable blade in relation to the fixed blade e.g. with a new machine and also after a grinding operation on the blades, and the eccentric 23 provides limited variation of the setting in a simple manner. To facilitate setting the spindle operating head 29 is graduated and rotatable in relation to a mark 33 on the top of the bearing 20.

With the above apparatus the movable blade on the beam can be accurately adjusted to give any required degree of cutting clearance at will to suit the thickness of plate being cut.

What I claim is:

1. A heavy-duty metal plate shearing machine comprising a machine frame, a fixed blade secured to said frame, alined, spaced, fixed bearings secured to said frame, a pivot shaft axially slidably mounted in said fixed bearings, a movable blade pivotally mounted on said shaft and secured against movement relative thereto in the axial direction thereof, said movable blade being mounted in cutting relation to said fixed blade, collars mounted on said shaft on opposite sides of one of said fixed bearings, a spindle mounted for rotation about its longitudinal axis on said fixed bearing, an eccentric mounted on said spindle, means for rotating said spindle and eccentric, a pair of plungers mounted on said fixed bearing for sliding movement parallel to the axis of said pivot shaft, each of said plungers being positioned tightly between said eccentric and one of said collars whereby rotary movement of said spindle and eccentric acting through said plungers and collars will effect endwise movement of said pivot shaft and lateral movement of said movable blade relative to said fixed blade.

2. A heavy-duty metal plate shearing machine as defined in claim 1 in which said collars are mounted on said pivot shaft by screw threads.

3. A heavy-duty metal plate shearing machine as defined in claim 1 in which said spindle and eccentric are mounted in a vertical bore in said fixed bearing and said plungers are mounted in a horizontal bore in said fixed bearing intersecting said vertical bore.

References Cited in the file of this patent

UNITED STATES PATENTS

| | | |
|---|---|---|
| 18,065 | Toulmin | Aug. 25, 1857 |
| 1,925,161 | Williams | Sept. 5, 1933 |
| 2,110,047 | Marofsky | Mar. 1, 1938 |
| 2,370,311 | Hercik | Feb. 27, 1945 |
| 2,638,804 | Heinrich | May 19, 1953 |
| 2,779,409 | Becker | Jan. 29, 1957 |

FOREIGN PATENTS

| | | |
|---|---|---|
| 111,403 | Germany | June 15, 1900 |